(12) United States Patent
Moriyama

(10) Patent No.: US 6,725,283 B2
(45) Date of Patent: Apr. 20, 2004

(54) PROGRAMMABLE CONTROLLER

(75) Inventor: Takao Moriyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 59 days.

(21) Appl. No.: 10/151,866

(22) Filed: May 22, 2002

(65) Prior Publication Data

US 2003/0105891 A1 Jun. 5, 2003

(30) Foreign Application Priority Data

Nov. 30, 2001 (JP) .................................. 2001-366321

(51) Int. Cl.[7] ................................................ G06F 3/00
(52) U.S. Cl. ........................ 710/2; 710/3; 710/5; 710/8; 711/100; 711/114
(58) Field of Search ............... 710/2, 3, 5, 8; 711/100, 114

(56) References Cited

U.S. PATENT DOCUMENTS

| | | | | |
|---|---|---|---|---|
| 5,546,079 A | * | 8/1996 | Wagner | 340/870.39 |
| 6,032,269 A | * | 2/2000 | Renner, Jr. | 714/37 |
| 6,446,141 B1 | * | 9/2002 | Nolan et al. | 710/8 |
| 2002/0161845 A1 | * | 10/2002 | Odenwald et al. | 709/209 |

FOREIGN PATENT DOCUMENTS

| | | |
|---|---|---|
| JP | 5-46214 | 2/1993 |
| JP | 5-274012 | 10/1993 |
| JP | 6-138916 | 5/1994 |
| JP | 9-6418 | 1/1997 |

* cited by examiner

*Primary Examiner*—Jeffrey Gaffin
*Assistant Examiner*—Alan Chen
(74) *Attorney, Agent, or Firm*—Sughrue Mion, PLLC

(57) ABSTRACT

The programmable controller composed of a main body unit and a plurality of input/output extension blocks is provided with type identifying means for identifying the number of input output points and present organization storing means. Upon receiving an organization update instruction signal, it can allocate input and output numbers in various ways by rewrite setting means in a system memory and can select a second allocation method with which existing input and output numbers are not changed or a first allocation method with which input and output numbers are completely changed anew. When input and output numbers are completely changed anew, it can automatically change input and output numbers accompanying an instruction in a program memory by instruction changing means in the system memory.

9 Claims, 13 Drawing Sheets

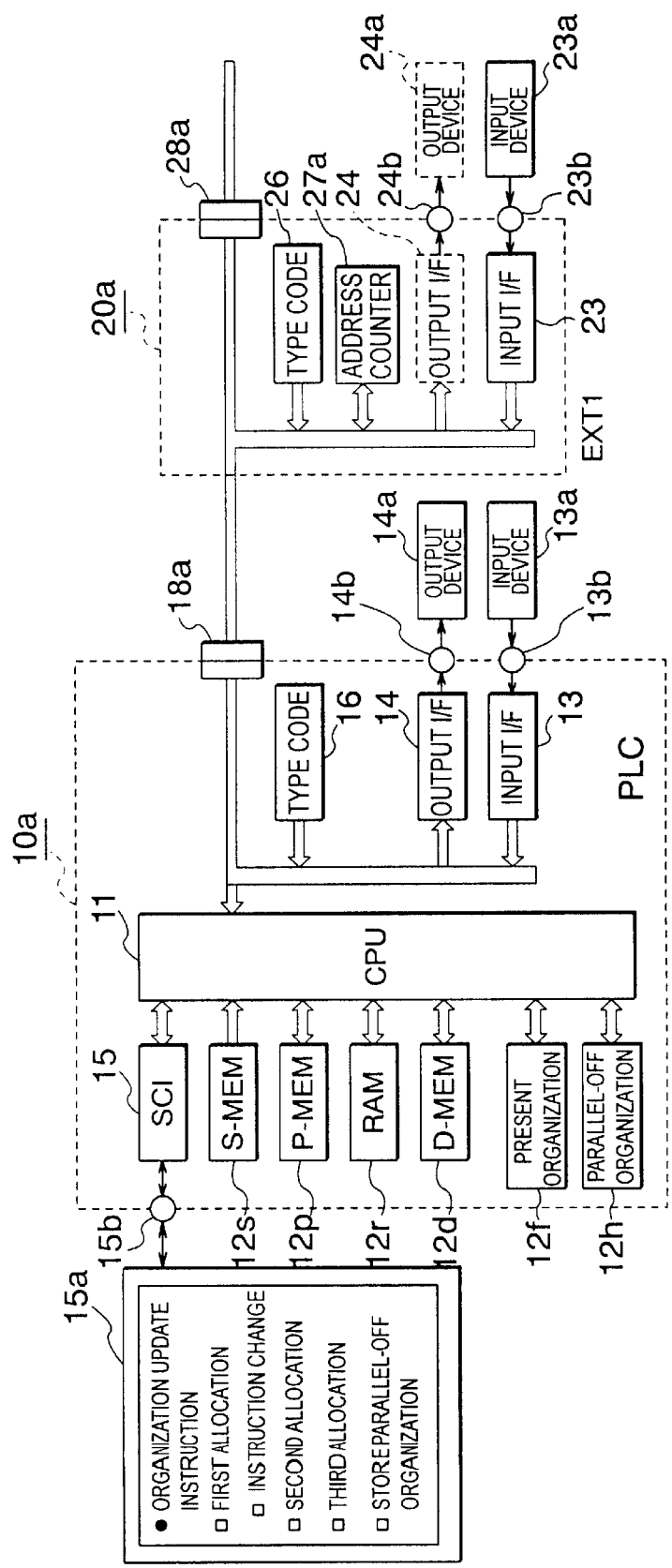

FIG. 2

| | bit7 | bit6 | bit5 | bit4 | bit3 | bit2 | bit1 | bit0 |
|---|---|---|---|---|---|---|---|---|
| ADR0 | X007 | X006 | X005 | X004 | X003 | X002 | X001 | X000 |
| ADR1 | X017 | X016 | X015 | X014 | X013 | X012 | X011 | X010 |
| ADR2 | X027 | X026 | X025 | X024 | X023 | X022 | X021 | X020 |
| ADR3 | X037 | X036 | X035 | X034 | X033 | X032 | X031 | X030 |
| ADR4 | X047 | X046 | X045 | X044 | X043 | X042 | X041 | X040 |
| ADR5 | X057 | X056 | X055 | X054 | X053 | X052 | X051 | X050 |
| ADR6 | X067 | X066 | X065 | X064 | X063 | X062 | X061 | X060 |
| ADR7 | X077 | X076 | X075 | X074 | X073 | X072 | X071 | X070 |
| ADR8 | X107 | X106 | X105 | X104 | X103 | X102 | X101 | X100 |
| ADR9 | X117 | X116 | X115 | X114 | X113 | X112 | X111 | X110 |
| ADR10 | X127 | X126 | X125 | X124 | X123 | X122 | X121 | X120 |
| ADR11 | X137 | X136 | X135 | X134 | X133 | X132 | X131 | X130 |
| ADR12 | | | | | | | | |
| ADR13 | | | | | | | | |
| ADR14 | | | | | | | | |
| ADR15 | | | | | | | | |
| ADR16 | Y007 | Y006 | Y005 | Y004 | Y003 | Y002 | Y001 | Y000 |
| ADR17 | Y017 | Y016 | Y015 | Y014 | Y013 | Y012 | Y011 | Y010 |
| ADR18 | Y027 | Y026 | Y025 | Y024 | Y023 | Y022 | Y021 | Y020 |
| ADR19 | Y037 | Y036 | Y035 | Y034 | Y033 | Y032 | Y031 | Y030 |
| ADR20 | Y047 | Y046 | Y045 | Y044 | Y043 | Y042 | Y041 | Y040 |
| ADR21 | Y057 | Y056 | Y055 | Y054 | Y053 | Y052 | Y051 | Y050 |
| ADR22 | Y067 | Y066 | Y065 | Y064 | Y063 | Y062 | Y061 | Y060 |
| ADR23 | Y077 | Y076 | Y075 | Y074 | Y073 | Y072 | Y071 | Y070 |
| ADR24 | Y107 | Y106 | Y105 | Y104 | Y103 | Y102 | Y101 | Y100 |
| ADR25 | Y117 | Y116 | Y115 | Y114 | Y113 | Y112 | Y111 | Y110 |
| ADR26 | Y127 | Y126 | Y125 | Y124 | Y123 | Y122 | Y121 | Y120 |
| ADR27 | Y137 | Y136 | Y135 | Y134 | Y133 | Y132 | Y131 | Y130 |
| ADR28 | | | | | | | | |
| ADR29 | | | | | | | | |
| ADR30 | | | | | | | | |
| ADR31 | | | | | | | | |

FIG. 3

| UNIT | NUMBER OF INPUT POINTS | TOP NUMBER | | | NUMBER OF OUTPUT POINTS | TOP NUMBER | | |
|---|---|---|---|---|---|---|---|---|
| MAIN BODY | 24 | X000 | X010 | X020 | 24 | Y000 | Y010 | Y020 |
| FIRST | 8 | X030 | | | 0 | | | |
| SECOND | 8 | X040 | | | 0 | | | |
| THIRD | 0 | | | | 8 | Y030 | | |
| FOURTH | 0 | | | | 0 | | | |

(a)

(b)

| STEP | COMMAND | DEVICE |
|------|---------|--------|
| 0 | LD | X00 |
| 1 | OR | M10 |
| 2 | AND | T10 |
| 3 | OUT | M10 |
| ⋮ | | |
| 200 | LD | X12 |
| 201 | ANI | M10 |
| 202 | OUT | Y21 |

INITIAL ALLOCATION

FIRST ALLOCATION (COMPLETELY CHANGE NUMBER)

SECOND ALLOCATION (ADD MISSING NUMBER)

THIRD ALLOCATION (MINIMUM MISSING NUMBER)

FIG. 12

|  | bit7 | bit6 | bit5 | bit4 | bit3 | bit2 | bit1 | bit0 |
|---|---|---|---|---|---|---|---|---|
| ADR0 | X007 | X006 | X005 | X004 | X003 | X002 | X001 | X000 |
| ADR1 | X017 | X016 | X015 | X014 | X013 | X012 | X011 | X010 |
| ADR2 | X027 | X026 | X025 | X024 | X023 | X022 | X021 | X020 |
| ADR3 | X037 | X036 | X035 | X034 | X033 | X032 | X031 | X030 |
| ADR4 | X047 | X046 | X045 | X044 | X043 | X042 | X041 | X040 |
| ADR5 | X057 | X056 | X055 | X054 | X053 | X052 | X051 | X050 |
| ADR6 | X067 | X066 | X065 | X064 | X063 | X062 | X061 | X060 |
| ADR7 | X077 | X076 | X075 | X074 | X073 | X072 | X071 | X070 |
| ADR8 | X107 | X106 | X105 | X104 | X103 | X102 | X101 | X100 |
| ADR9 | X117 | X116 | X115 | X114 | X113 | X112 | X111 | X110 |
| ADR10 | X127 | X126 | X125 | X124 | X123 | X122 | X121 | X120 |
| ADR11 | X137 | X136 | X135 | X134 | X133 | X132 | X131 | X130 |
| ADR12 |  |  |  |  |  |  |  |  |
| ADR13 |  |  |  |  |  |  |  |  |
| ADR14 |  |  |  |  |  |  |  |  |
| ADR15 | X177 | X176 | X175 | X174 | X173 | X172 | X171 | X170 |
| ADR16 | Y007 | Y006 | Y005 | Y004 | Y003 | Y002 | Y001 | Y000 |
| ADR17 | Y017 | Y016 | Y015 | Y014 | Y013 | Y012 | Y011 | Y010 |
| ADR18 | Y027 | Y026 | Y025 | Y024 | Y023 | Y022 | Y021 | Y020 |
| ADR19 | Y037 | Y036 | Y035 | Y034 | Y033 | Y032 | Y031 | Y030 |
| ADR20 | Y047 | Y046 | Y045 | Y044 | Y043 | Y042 | Y041 | Y040 |
| ADR21 | Y057 | Y056 | Y055 | Y054 | Y053 | Y052 | Y051 | Y050 |
| ADR22 | Y067 | Y066 | Y065 | Y064 | Y063 | Y062 | Y061 | Y060 |
| ADR23 | Y077 | Y076 | Y075 | Y074 | Y073 | Y072 | Y071 | Y070 |
| ADR24 | Y107 | Y106 | Y105 | Y104 | Y103 | Y102 | Y101 | Y100 |
| ADR25 | Y117 | Y116 | Y115 | Y114 | Y113 | Y112 | Y111 | Y110 |
| ADR26 | Y127 | Y126 | Y125 | Y124 | Y123 | Y122 | Y121 | Y120 |
| ADR27 | Y137 | Y136 | Y135 | Y134 | Y133 | Y132 | Y131 | Y130 |
| ADR28 |  |  |  |  |  |  |  |  |
| ADR29 |  |  |  |  |  |  |  |  |
| ADR30 |  |  |  |  |  |  |  |  |
| ADR31 |  |  |  |  |  |  |  |  |

FIG. 13

| UNIT | NUMBER OF INPUT POINTS | TOP NUMBER |  |  | NUMBER OF OUTPUT POINTS | TOP NUMBER |  |  |
|---|---|---|---|---|---|---|---|---|
| MAIN BODY | 24 | X000 | X010 | X020 | 24 | Y000 | Y010 | Y020 |
| STATION NUMBER 1 | 8 | X030 |  |  | 0 |  |  |  |
| STATION NUMBER 2 | 8 | X040 |  |  | 0 |  |  |  |
| STATION NUMBER 3 | 0 |  |  |  | 8 | Y030 |  |  |
| STATION NUMBER 4 | 0 |  |  |  | 0 |  |  |  |

INITIAL ALLOCATION

FIRST ALLOCATION(COMPLETELY CHANGE NUMBERS ANEW)

SECOND ALLOCATION (ADD MISSING NUMBER)

THIRD ALLOCATION (MINIMUM MISSING NUMBER)

PROGRAMMABLE CONTROLLER

BACKGROUND OF THE INVENTION

1. Field of the Invention

The present invention relates to a programmable controller and, more particularly, to a programmable controller with a function of extending inputs and outputs, in which a method of handling input and output numbers when an input/output organization is changed is improved.

2. Description of the Related Art

In general, a programmable controller is composed of a group of a CPU unit (block) which includes a microprocessor and various memories, and various standardized input units (blocks) or output units (blocks). As an input unit and an output unit, there are, for example, an eight-point type unit and a sixteen-point type unit as well as an input/output mixed unit with eight input points and eight output points, in which a necessary number of input units, output units and the like are selected and used according to the number of input and output points of a machine to be a target of control. These input/output units are put to practical use in various forms, for example, as an integral structure thereof connected by a CPU unit and a mother board (hereinafter referred to as form 1) or as a separate structure in which an input/output extension unit is externally connected to a main body unit that contains a CPU unit and a part of input/output units (hereinafter referred to as form 2).

In relation to a programmable controller belonging to the above-mentioned form 1, in Japanese Patent Laid-open No. 6-138916 ("Data Transfer Method of I/O module"), a programmable controller is configured to classify I/O modules (input/output units) into those for input and those for output to determine an address order in accordance with the connection order of slots connected thereto. Similarly to this method, in Japanese Patent Laid-open No. 5-46214 ("Board Connection Apparatus of Programmable Controller"), a programmable controller sends an allocation control signal by pin connection of cross-connected connectors in order to automatically execute allocation of input/output numbers of I/O extension boards, and each of the I/O extension boards receives a specific combination signal according to their connection order (see the above reference that describes a determining method of an order of connection).

In relation to a programmable controller belonging to the above-mentioned form 2, in Japanese Patent Laid-open No. 9-6418 ("Setting Display Apparatus"), an input/output unit externally attached to a programmable controller incorporated in a setting display apparatus is configured to set input and output numbers separately for input and output and in the order of connection, and a determination method of an order of connection is described. Similarly, in Japanese Patent Laid-open No. 5-274012 ("Programmable Controller for variably allocating input and output"), the programmable controller can change and set input/output allocation of I/O memories from time to time even if the number of a plurality of I/O devices connected via buses to the programmable controller or the number of words is changed, and each I/O device is provided with a station number setting unit.

According to the conventional art described above, when a connection organization of input/output units is changed, since a method of changing input and output numbers is uniform, input and output numbers cannot be freely allocated as desired by a user. For example, if two eight-point type input units are used and one of the input units is removed, it is reasonable to determine according to a user's intention whether input numbers to be handled on a sequence program should be made missing numbers or these are automatically supplemented so as not to leave missing numbers. Similarly, if two eight-point type input units are used initially but one of them is changed to a sixteen-point type input unit to thereby have an extended input of total twenty-four points, more complicated options are required for a method of allocating input and output numbers.

In order to cope with this problem, some programmable controllers are provided with a parameter memory for defining types and arrangements of input/output units (the number of input points and the number of output points) and the top input and output numbers, so that a user can perform writing into a parameter memory at the stage of programming. With the parameter memory method, if an input and output arrangement is changed, the user can allocate input and output numbers as desired by rewriting the parameter memory according to the changed contents. However, since the writing operation is complicated, the parameter memory method is not suitable for a novice computer user who is unfamiliar with operations of a computer.

SUMMARY OF THE INVENTION

The present invention has been devised in view of the above and other drawbacks, and it is an object of the present invention to provide a programmable controller with which a user can easily allocate input and output numbers in a manner as intended by the user.

With the above object in view, the programmable controller of the present invention comprises a main body unit containing a microprocessor and various memories, the microprocessor operating in accordance with contents of a program memory in which a sequence program is stored and contents of a system memory in which a system program is stored to thereby generate a signal to an output device corresponding to a signal from an input device. The programmable controller comprises a plurality of input/output extension blocks connected to said main body unit. The programmable controller comprises block type identifying means that is provided in each of said input/output extension blocks and identifies a type and an arrangement of an input/output extension block which indicate the number of input and output points in said input/output extension block. Also provided are communication identifying means that is provided in each of said input/output extension blocks and identifies an input/output extension block communicating with said microprocessor and present organization storing means provided in said main body unit, which sequentially reads addresses of the input/output extension blocks with which communication is currently being conducted based on a result of identification by said communication identifying means, and stores input and output numbers corresponding to types and arrangements of input/output extension blocks obtained by said block type identifying means of the input/output extension blocks. Rewrite setting means that determines existence of an organization update instructing signal that is inputted from the outside following change, addition or removal of said input/output extension block and updates, in response to a result of the determination, contents of said present organization storing means by an allocation method selected from a plurality of predetermined allocation methods designated by said organization update instructing signal, is provided. Allocation of input/output numbers on said sequence program is carried out by a method selected from said plurality of allocation methods according to contents of said rewrite setting means. Therefore, since allocation of input/output numbers can be readily carried out by a learning operation without relying on rewriting of parameters as conventionally done, even a novice user who is unfamiliar with operations of a computer can easily allocate input/output numbers.

BRIEF DESCRIPTION OF THE DRAWINGS

In the accompanying drawings:

FIG. 1 is a block diagram showing a configuration of a programmable controller in accordance with a first embodiment of the present invention;

FIG. 2 is a table showing contents of a device memory provided in the programmable controller in accordance with the first embodiment of the present invention;

FIG. 3 is a table showing contents of a present organization memory provided in the programmable controller in accordance with the first embodiment of the present invention;

FIGS. 4A and 4B are explanatory views, in which FIG. 4A shows a ladder circuit diagram and FIG. 4B shows a program list, of the programmable controller in accordance with the first embodiment of the present invention;

FIG. 12 is a table showing contents of a device memory provided in the programmable controller in accordance with the second embodiment of the present invention;

FIG. 13 is a table showing contents of a present organization memory provided in the programmable controller in accordance with the second embodiment of the present invention;

DESCRIPTION OF THE PREFERRED EMBODIMENTS

Figure 4:
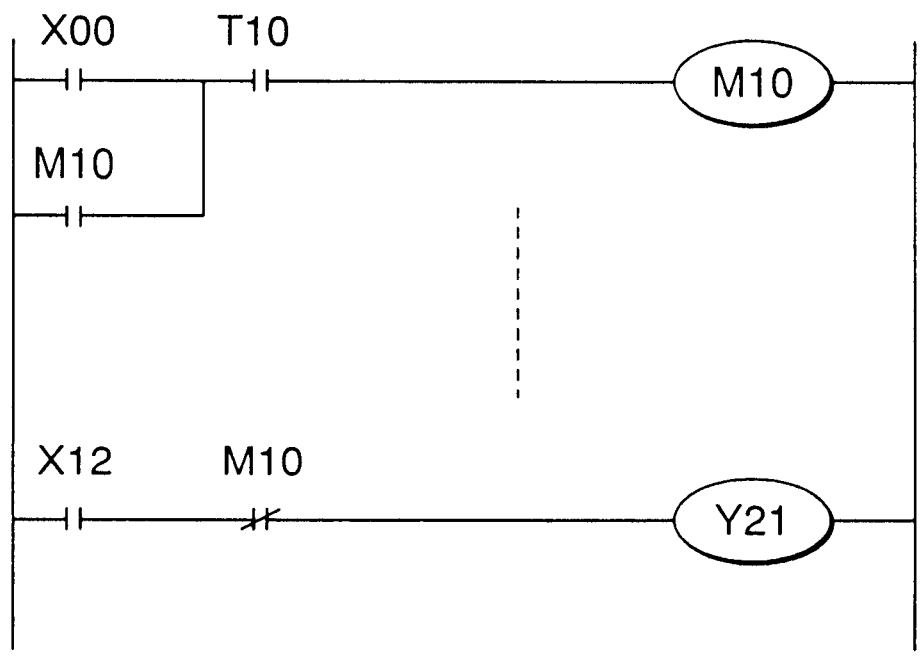

Embodiments of the present invention will be hereinafter described with reference to drawings.

First Embodiment

FIG. 1 is a block diagram showing a configuration of a programmable controller in accordance with a first embodiment of the present invention. In FIG. 1, reference numeral 10a denotes a main body unit of the programmable controller, whose configuration is as described below. Reference numeral 11 denotes a microprocessor connected via buses to various memories and interface circuits to be described later, 12s denotes a system memory such as a flash memory having stored therein a system program that is created by a manufacturer of the programmable controller so that the microprocessor carries out basic operations, 12p denotes a program memory such as an EEPROM having stored therein a sequence program created by a user according to contents of control to be performed for a control target machine, 12r denotes an RAM memory for arithmetic processing, 12d denotes a device memory functioning as a part of the RAM memory, 12f denotes a present organization memory (present organization storing means) for sequentially reading block addresses of input/output extension blocks with which communication is currently being conducted, based on an identification result from communication identifying means 27a to be described later, and storing input and output numbers corresponding to types and arrangements of the input/output extension blocks, as will be described in detail with reference to FIG. 3, and 12h denotes a parallel-off organization memory (parallel-off organization storing means) to be described later for storing organizations of other input/output extension blocks connected to the main body unit 10a when an input/output extension block 20 has been paralleled-off from the main body unit and a parallel-off organization storing instruction is inputted from an external tool 15a. Further, ON/OFF states or driven/non-driven states of various devices such as an input relay X, an output relay Y, an auxiliary relay M, a timer T and a counter C handled by the programmable controller are stored as I/O information in the above-mentioned device memory 12d. A configuration of a part of the device memory 12d will be described in FIG. 2 in detail.

Reference numeral 13 is an input interface circuit composed of a voltage level converting circuit and an optical isolation circuit, to which various operation switches, sensor switches and the like constituting an input device 13a are connected via a terminal strip 13b. Reference numeral 14 denotes an output interface circuit composed of a voltage level converting circuit and an optical isolation circuit, to which various display devices, load driving devices and the like constituting an output device 14a are connected via a terminal strip 14b. Reference numeral 15 denotes a serial communication interface (SCI) circuit, to which an external tool 15a such as a graphic operation terminal or a programming tool by a not-shown personal computer is connected via a connector 15b.

Reference numeral 16 denotes unit type identifying means that is provided in the above-mentioned main body unit 10a and identifies a type of a unit with respect to the above-mentioned main body unit 10a. The unit type identifying means 16 represents the number of input points and the number of output points, which are handled by the input interface circuit 13 and the output interface circuit 14 that are incorporated in the main body unit 10a, by a unit of byte, for example. A type code is represented as #43 if the number of input points is thirty-two and the number of output points is twenty-four. Further, the above-mentioned type code is obtained by turning, for example, a switch pattern of eight bits provided on a not-shown printed circuit board in the main body unit 10a, into an ON or OFF by either short-circuiting or not short-circuiting it with a jumper wire, and then coding it. Reference numeral 18a is a detachable connector for connecting input/output extension blocks 20a, 30a and 40a (30a and 40a are not shown) to be described later to the above-mentioned microprocessor 11 via buses. In this way, in this embodiment, the main body unit 10a and the input/output extension block 20a are configured as separate bodies and the main body unit 10a includes a part of an input/output function.

As for constituent elements of the above-mentioned input/output extension block 20a, reference numeral 23 denotes an input interface circuit composed of a voltage level converting circuit and an optical isolation circuit, to which various operating switches, sensor switches and the like constituting an input device 23a are connected via a terminal strip 23b. Reference numeral 24 denotes an output interface circuit composed of a voltage level converting circuit and an optical insulating circuit, to which various display devices, load driving device and the like constituting an output device 24a are connected via a terminal strip 24b. Further, if the above-mentioned input/output extension block 20a is dedicated for input, the output interface circuit 24 is removed. Conversely, if it is dedicated for output, the input interface circuit 23 is removed. If it is for both input and output, both the interface circuits are provided.

Reference numeral 26 denotes block type identifying means that is provided in the above-mentioned input/output extension block 20a and identifies a type of a block with respect to the above-mentioned input/output extension block 20a. Like the above-mentioned unit type identifying means 16, the block type identifying means 26 identifies a type and arrangement, which consist of the number of input points and the number of output points that are handled by the input interface circuit 23 and the output interface circuit 24 incorporated in the main body unit, and represents it by, for example, a unit of byte. A type code is represented as #21 if the number of input points is sixteen and the number of output points is eight. Further, the above-mentioned type code is obtained by turning, for example, a switch pattern of eight bits, which is provided on a not-shown printed circuit board as in the case of the main body unit 10a, into an ON or OFF state by either short-circuiting or not short-circuiting it with a jumper wire, and then coding it.

Reference numeral 27a denotes communication identifying means for identifying an input/output extension block that is communicating with a microprocessor 11 when the microprocessor 11 carries out communication for exchanging input/output signals with a plurality of input/output extension blocks. In the embodiment shown in FIG. 1, a subtraction address counter method is used. In this method, in response to a block address BAD sent by the microprocessor 11, an input/output extension block connected to the next stage sends a block address BAD−1 to an input/output extension block in the subsequent stage. According to the method, by repeating similar subtractions, block addresses to be received by input/output extension blocks connected to subsequent stages become progressively smaller. Moreover, an input/output block having received a block address 0 is given a right to communicate with the microprocessor 11. Therefore, if the microprocessor 11 intends to communicate with an input/output block in the third stage, it is sufficient to send a block address BAD=3. Reference numeral 28a denotes a detachable connector for connecting an input/output extension block in a later stage.

In FIG. 2 showing a configuration of a part of the device memory 12d of FIG. 1, ON/OFF information of inputs X000 to X007 is stored as I/O signals in a memory address ADR0. Similarly, ON/OFF information of inputs X130 to X137 is stored as I/O signals in a memory address ADR11. The above-mentioned input numbers X000 to X137 correspond to terminal symbols allocated to the terminal strips of the above-mentioned main body unit 10a and input/output extension block 20a, and are, at the same time, input numbers that are also used as device numbers handled in the program memory 12p. Operation/non-operation information of outputs Y000 to Y007 is stored as I/O signals in a memory address ADR16. Similarly, operation/non-operation information of outputs Y130 to Y137 is stored as I/O signals in a memory address ADR27. The above-mentioned output numbers Y000 to Y137 correspond to terminal symbols allocated to the terminal strips of the above-mentioned main body unit 10a and input/output extension block 20a, and are, at the same time, output numbers that are also used as device numbers handled in the program memory 12p.

Figure 5:
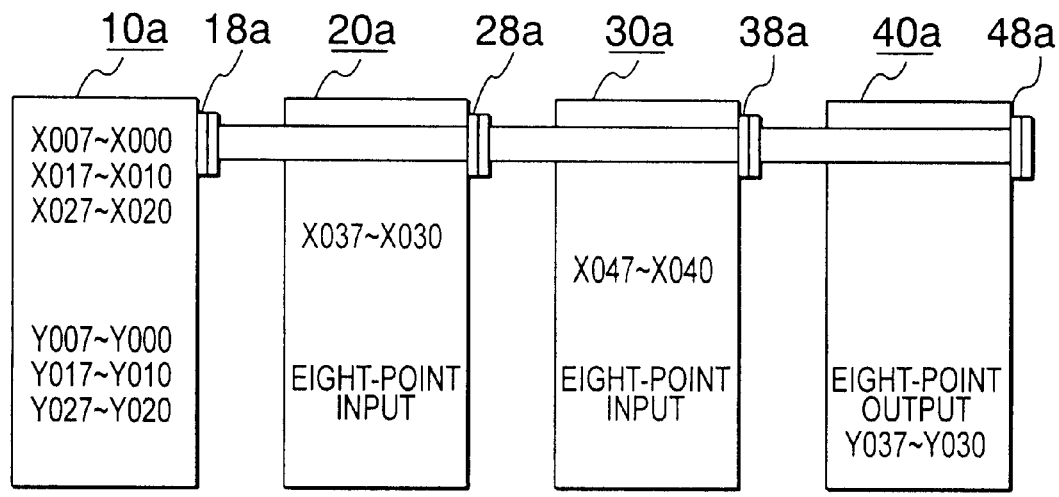
FIG. 5 is an explanatory view showing an example of an initial extended organization of the programmable controller in accordance with the first embodiment of the present invention.

FIG. 3 showing an example of contents of an example of the present organization memory 12f of FIG. 1 corresponds to FIG. 5 showing an input/output organization to be described later. In this example, it is indicated that the number of input points is twenty-four, the top input number is X000, the number of output points is twenty-four and the top output number is Y000 for of the main body unit. It is indicated that the number of input points is eight, the top input number is X030 and the number of output points is zero for a first input/output extension block connected to a position closest to the main body unit. Next, it is indicated that the number of input points is eight, the top input number is X040 and the number of output points is zero for a second input/output extension block connected next to the first input/output extension block. Similarly, it is indicated that the number of input points is zero, the number of output points is eight and the top output number is Y030 for a third input/output extension block connected next to the second input/output extension block, and a following fourth input/output extension block is not connected.

In FIG. 4 showing an example of a sequence program to be stored in the program memory 12p of FIG. 1, a program list corresponding to FIG. 4A showing a ladder sequence diagram is shown in FIG. 4B. Such a program list is automatically generated by drawing a ladder diagram using a not-shown program tool and applying a converting operation to it. The programmable controller is allowed to operate by transferring and writing into the program memory 12p. Further, X00 and X12 as input numbers, Y21 as an output number and the like are used also in the above-mentioned program list.

FIGS. 5 to 8 show examples of an entire organization of the programmable controller using the main body unit 10a and the input/output extension blocks 20a, 30a, 40a and 50a. In FIGS. 5 to 8, the main body unit 10a is provided with inputs and outputs of twenty-four input points represented by X000 to X027 and twenty-four output points represented by Y000 to Y027. In FIG. 5 shown as an initial organization, the eight-point type input extension block 20a, the eight-point type input extension block 30a and the eight-point type output extension block 40a are used, and input/output numbers being serial numbers from those assigned to the main body unit 10a are assigned to each input/output extension block. Moreover, the input extension block 20a that is closer to the main body unit 10a than the input extension block 30a is assigned smaller serial numbers than those assigned to the input extension block 30.

Figure 6:
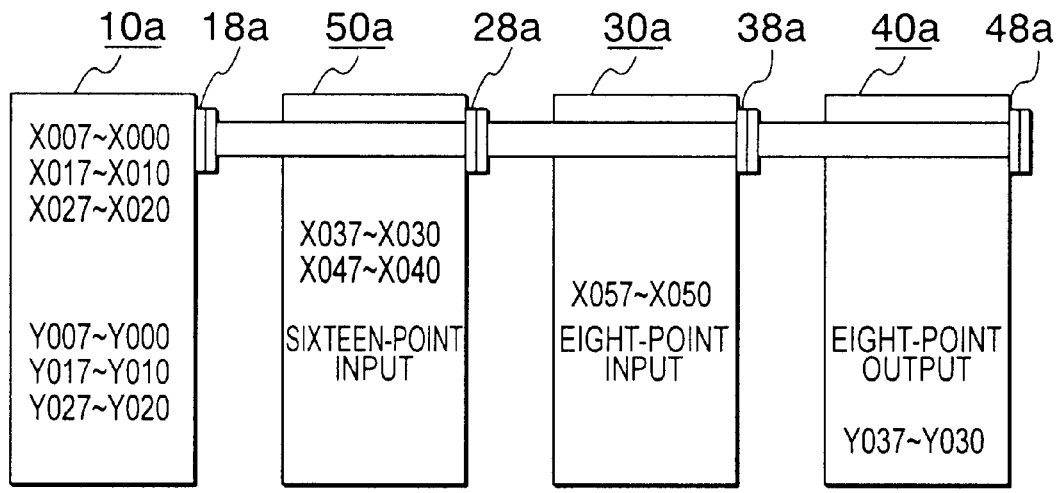
FIG. 6 is an explanatory view showing an example of an organization of the programmable controller by a first allocation method, in accordance with the first embodiment of the present invention.

In FIG. 6 showing an example of changing an organization based on a first allocation method, a sixteen-point type input extension block 50a is used instead of the eight-point type input extension block 20a. In the first allocation method, input/output numbers of all new and old input/output extension blocks organized anew are allocated as serial numbers that are continuous from input/output numbers of the main body unit, in the arrangement order in the organization or in the order of station numbers. Thus, X030 to X047 that are serial numbers from those allocated to the main body unit 10a are allocated as input numbers of the input extension block 50a positioned in the next stage of the main body unit 10a. Moreover, input numbers allocated to the input extension block 30a positioned in the next stage of the input extension block 50a is changed to X050 to X057 that are so assigned to be serial to those allocated to the block of the previous stage. The eight-point type output extension block 40a is not affected by the change of an organization and has the same output numbers Y030 to Y037.

Figure 7:
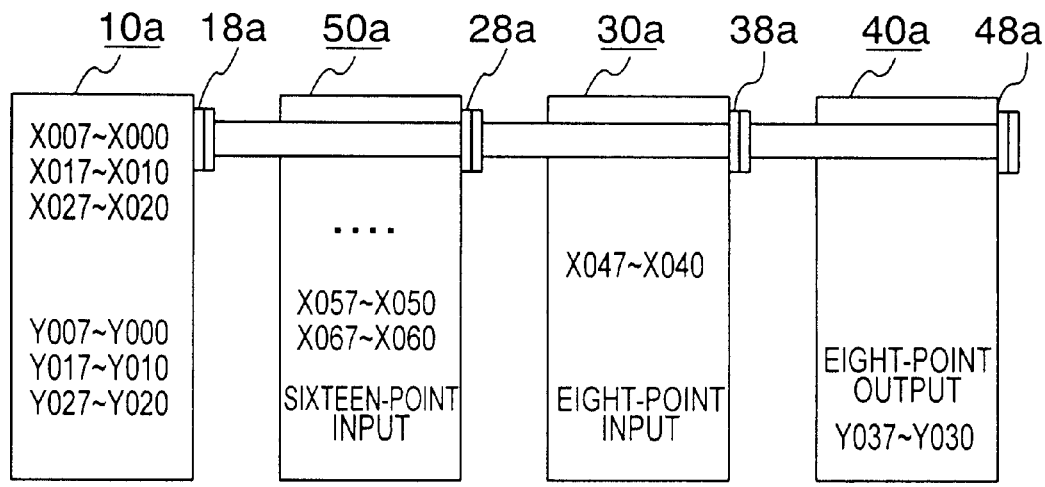
FIG. 7 is an explanatory view showing an example of an organization of the programmable controller by a second allocation method, in accordance with the first embodiment of the present invention.

In FIG. 7 showing an example of changing an organization based on a second allocation method, the sixteen-point type input extension block 50a is used instead of the eight-point type input extension block 20a in FIG. 5. In the second allocation method, when an input/output extension block existing in the present organization is removed in a new organization, deleted input/output numbers are treated as missing numbers and, when an input/output extension block that did not exist in the present organization is added in a new organization, input/output numbers that are thus added are treated as additional numbers to the present organization, whereby input/output numbers allocated to remaining input/output extension blocks are not changed. Thus, X050 to X067 that are serial numbers from those allocated to the existing input extension block 30a are allocated despite the fact that the replaced and newly provided input extension block 50a are directly connected to the main body unit 10a. Therefore, the input numbers X030 to X037 of the input extension block 20a that is removed in the new organization are treated as missing numbers and thus the input numbers of the remaining input extension block 30a have not been changed. The eight-point type output extension block 40a is not affected by the change of an organization and thus has the same output numbers Y030 to Y037.

Figure 8:
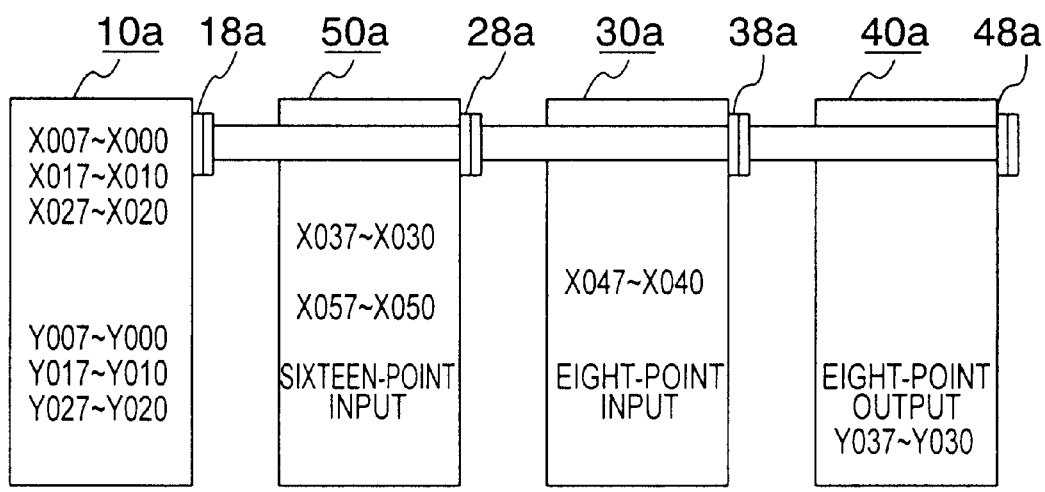
FIG. 8 is an explanatory view showing an example of an organization of the programmable controller by a third allocation method, in accordance with the first embodiment of the present invention.

In FIG. 8 showing an example of changing an organization based on a third allocation method, the sixteen-point type input extension block 50a is used instead of the eight-point type input extension block 20a in FIG. 5. In the third allocation method, when an input/output extension block existing in the present organization is changed to an input/output block of another form in a new organization, missing input/output numbers are restricted to minimum and input/output numbers that did not exist in the present organization are treated as additional numbers to those of the present organization, whereby input/output numbers are allocated so as not to change input/output numbers of the remaining input/output extension blocks. Thus, X030 to X037 allocated in a manner to the removed input extension block 20a and X050 to X067 that are serial numbers from those of the existing input extension block 30a are allocated as input numbers of the replacing and newly provided input extension block 50a. Therefore, the input numbers X030 to X037 of the input extension block 20a that is replaced and removed in the new organization are not treated as missing numbers and thus the input numbers of the remaining input extension block 30a have not been changed. The eight-point type output extension block 40a is not affected by the change of an organization and thus has the same output number Y030 to Y037.

The present organization memory 12f of FIG. 1 is for storing a type code, that is, the number of input/output points, of the main body unit 10a and type codes, that is, the numbers of input/output points in input/output extension blocks arranged in subsequent stages in accordance with an order of connection, as described in FIG. 3. The present organization memory 12f stores a current input/output organization even if the input/output organization is changed, unless an organization update instruction signal to be described later is generated. Further, the above-mentioned second and third allocation methods are suitable for an input/output organization changing processing that is performed temporarily during a trial operation of the programmable controller. The first allocation method is suitable for arranging a permanent input/output organization, at the time of initial operation of the programmable controller when the present organization storing means has not yet stored an input/output organization or after it has reset the input/output organization it stored, or in a final stage after various trial operations have been performed.

In relation to the input/output organizations of FIGS. 5 to 8, it is required to note the following issues. That is, if an input/output extension block is added to the next stage (right side in the figure) of an existing input/output organization, input/output numbers of the added input/output extension block are larger serial numbers with respect to the input/output numbers of the existing input/output extension block in any of the first, second and third allocation methods. Therefore, when adding an input/output extension block, confusion is avoided if it is added in the subsequent stage, rather than inserting it between existing blocks.

Regarding removal of an existing input/output extension block, if an input/output extension block existing between different types of blocks has been removed, it is possible to determine which input/output extension block has been removed by comparing new and old organizations against each other. However, if identical type of blocks (e.g., the eight-point type input extension blocks 20a and 30a in FIG. 5) are adjacent to each other and one of them has been removed, it is impossible to determine which block has been removed by comparing new and old organizations against each other. Examining the case in which another input/output extension block is additionally inserted between existing input/output extension blocks, when an input/output extension block of a different type has been inserted, it is possible to determine which input/output extension block has been inserted by comparing new and old organizations against each other. However, when a new input/output block identical with existing blocks is inserted between them, it is impossible to determine which block has been newly inserted by comparing new and old organizations against each other.

The parallel-off organization memory 12h is a memory provided for solving the above-mentioned problems. For example, after pulling the detachable connector 28a of FIG. 5 and paralleling off the input/output extension blocks 30a and 40a (i.e., separating them from the main body unit 10a), when a parallel-off organization storing instruction to be described later is given, an organization consisting of the remaining main body unit 10a and input/output extension block 20a is additionally stored in the memory. Thereafter, for example, if the input/output extension block 30a is removed and then the separated remaining blocks are connected, it will be clear which of the input/output extension blocks 20a and 30a has been removed by making comparison among new and old organizations and a parallel-off organization. The same is true for the case in which an existing input/output extension block is replaced with a block of a different type. If it is set as a rule that an organization in a parallel-off state is stored, and that, at the same time, an input/output extension block to be removed, inserted or changed is one that comes in the front of a parallel-off portion (or one arranged in the stage subsequent to the existing input/output extension blocks), it is possible to determine a changed input/output extension block by referring to new and old organizations and a parallel-off organization.

Figure 9:
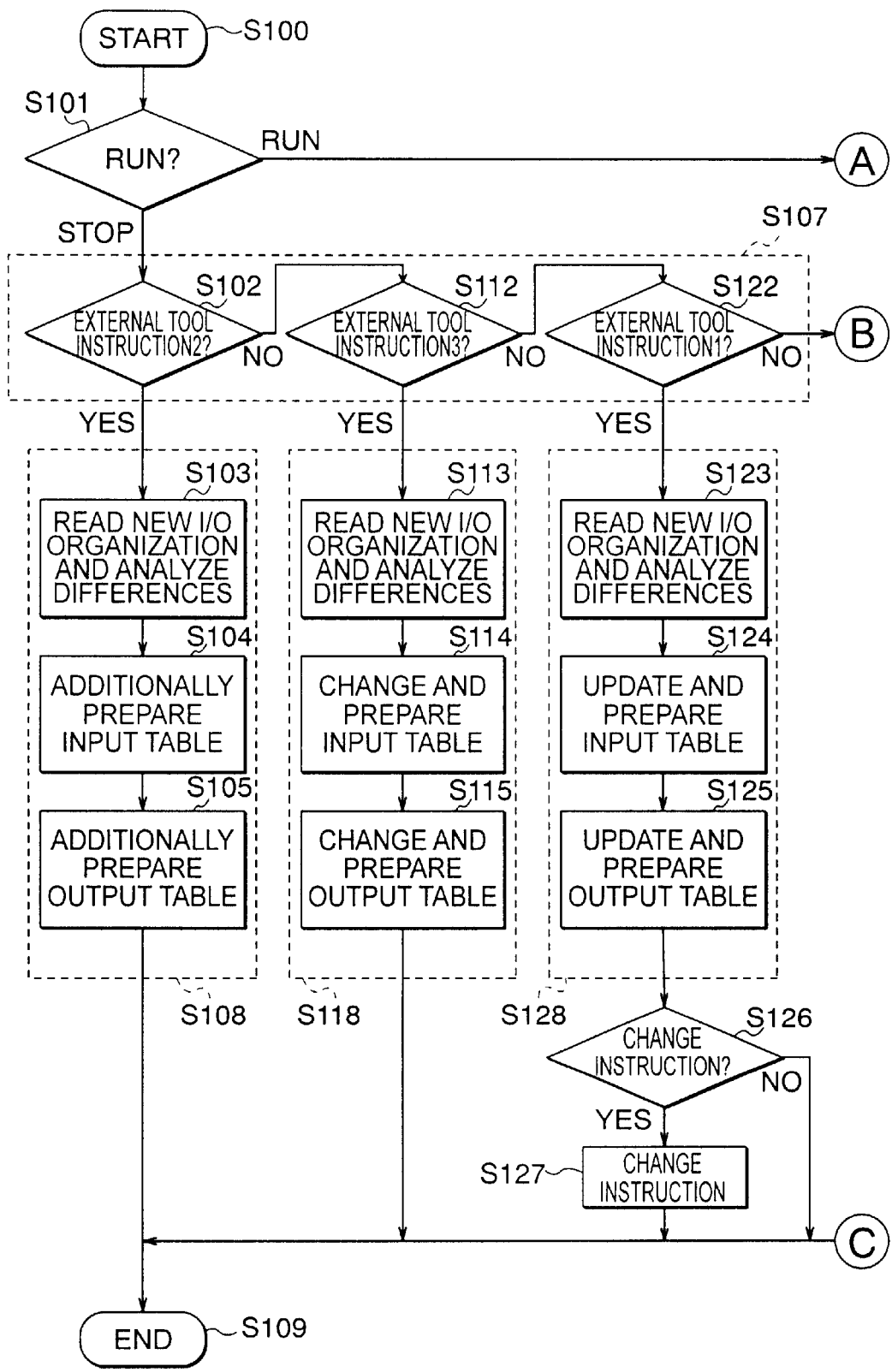
FIG. 9 is a flow diagram showing a flow of processing of the programmable controller in accordance with the first embodiment of the present invention.
Figure 10:
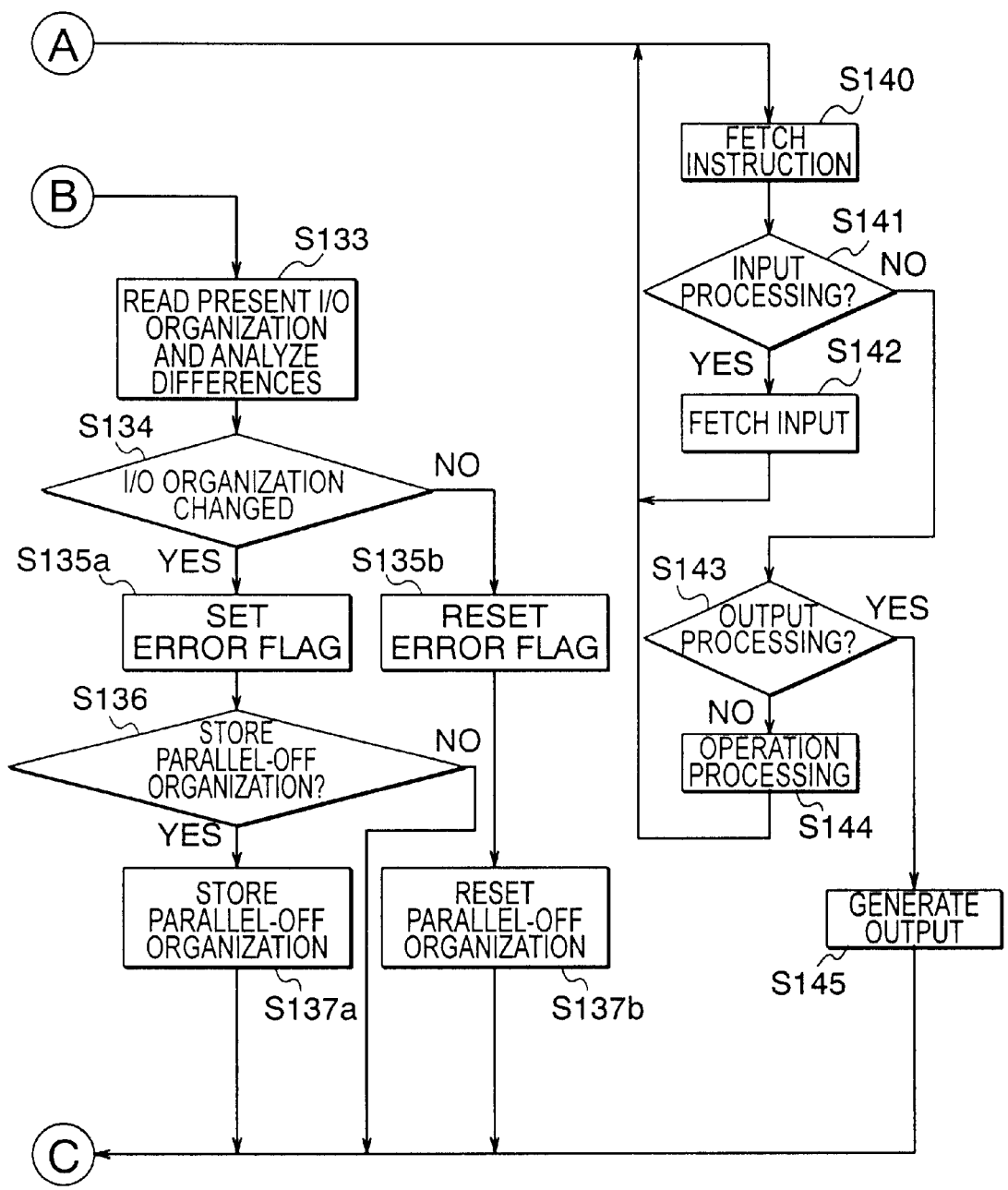
FIG. 10 is a flow diagram showing a flow of processing of the programmable controller in accordance with the first embodiment of the present invention.

Next, operations of the programmable controller according to the first embodiment shown in FIG. 1 will be described. FIGS. 9 and 10 are flow charts for describing a part of operations of a system program stored in the system memory 12s of FIG. 1. In FIGS. 9 and 10, reference character S100 denotes an operation starting step of the microprocessor 11, S101 denotes a step acting subsequent to the step S100 to determine a state of a not-shown RUN/STOP switch provided in the main body unit 10a; S102 denotes a step acting when the step S101 determines a current state as STOP, to determine whether or not a touch key of the second allocation shown in a screen message of the external tool 15a has been pressed; S103 denotes a step acting when the step S102 determines YES, to compare reading of an input/output organization at the present point in time against contents of the present organization memory 12f already stored and analyze differences between the organizations; S104 denotes a step of allocating input numbers of each input/output extension block based on a result of the above-mentioned analysis as shown in FIG. 7; S105 denotes a step of allocating output numbers of each output extension block in a manner as shown in FIG. 7; and S108 denotes rewrite setting means of the second allocation method consisting of the above-mentioned steps S103, S104 and S105, which updates and rewrites the present organization memory 12f through the above-mentioned steps S104 and S105.

Reference character S112 denotes a step acting when the step S102 determines NO, to determine whether or not a touch key for the third allocation method shown in a screen message of the external tool 15a has been pressed; S113 is a step acting when the step S112 determines YES to compare reading of an input/output organization at the present point in time against contents of the present organization memory 12f already stored to thereby analyze differences between the organizations; S114 denotes a step of allocating input numbers of each input extension block based on a result of the above-mentioned analysis as shown in FIG. 8; S115 denotes a step of allocating output numbers of each output extension block in a manner as shown in FIG. 8; and S118 denotes rewrite setting means of the third allocation method consisting of the above-mentioned steps S113, S114 and S115, which updates and rewrites the present organization memory 12f through the above-mentioned steps S114 and S115.

Reference character S122 denotes a step acting when the step S112 determines NO to determine whether or not a touch key for the first allocation method shown in the screen message of the external tool 15a has been pressed; S123 denotes a step acting when the step S122 determines YES to compare reading of an input/output organization at the present point in time against contents of the present organization memory 12f already stored to thereby analyze differences between the organizations; S124 denotes a step of allocating input numbers of each input extension block based on a result of the above-mentioned analysis in a manner as shown in FIG. 6; S125 denotes a step of allocating output numbers of each output extension block in a manner as shown in FIG. 6; S126 denotes a step acting subsequent to the step S125 to determine whether or not a touch key for changing an instruction, which is shown in the screen message of the external tool 15a, has been selected and operated; S127 denotes a step acting when the step S126 determines YES to change input/output numbers in the sequence program that is stored in the above-mentioned program memory 12p, based on the input/output number system that has been organized anew; and S128 denotes rewrite setting means of the first allocation method consisting of the above-mentioned steps S123, S124 and S125, which updates and rewrites the present organization memory 12f through the above-mentioned steps S124 and S125.

Reference character S133 denotes a step acting when the step S122 determines NO to compare reading of an input/output organization at the present point in time against contents of the present organization memory 12f already stored to thereby analyze differences between the organizations; S134 denotes a step acting subsequent to the step S133 to determine whether or not an input/output organization has been changed; S135a denotes a step acting when the step S134 determines that an input/output organization has been changed, to set a not-shown error flag; S136 denotes a step acting subsequent to the step S135a to determine whether or not a touch key for storing a parallel-off organization indicated in the screen message of the external tool 15a has been pressed (parallel-off organization storing instruction); S137a denotes a step acting when the step S136 determines YES to store an organization of the remaining input/output extension blocks in the parallel-off state into the parallel-off organization memory 12h of FIG. 1; S135b is a step acting when the step S134 determines that an input/output organization has not been changed, to reset the error flag set in step S135a; and S137b denotes a step acting subsequent to the step S135b to reset the contents of the parallel-off organization memory 12h of FIG. 1 stored in step S137a.

Reference character S140 denotes a step acting when the step S101 determines RUN or following steps S142 and S144 to be described later, to read one of sequence instructions from the above-mentioned program memory 12p; S141 denotes a step acting subsequent to the step S140 to determine whether or not the fetched sequence instruction is an input instruction; and S142 denotes a step acting when the step S141 determines that the fetched sequence instruction is an input instruction, to read input by an input device into the device memory 12d, as a result of which an ON/OFF state at the time of executing an instruction is written in a corresponding input portion of the device memory 12d (see FIGS. 1 and 2). Reference character S143 denotes a step acting when the step S141 determines NO to determine whether or not the fetched sequence instruction is an output instruction, S144 denotes a step acting when the step S143 determines NO to apply an arithmetic operation to the sequence instruction fetched in step S140 and to write the result of the operation in the RAM memory 12r; and S145 is a step acting when the step S143 determines YES to execute an output, as a result of which an operational state at the time of executing the instruction is written in a corresponding output portion of the device memory 12d (see FIGS. 1 and 2), whereby an output device is driven.

Reference character S107 denotes means for determining existence of an organization update instruction consisting of the above-mentioned steps S102, S112 and S122, and S109 denotes an operation ending step acting when the determining steps S126 and S136 determine NO or following the above-mentioned steps S105, S115, S127, S137a, S137b and S145 to shift the processing to the starting step S100, for example, after a predetermined period of time following the end of the operation. Further, when an error flag is set by the step S135a, it is displayed on the screen of the external tool 15a. However, it is also possible to operate the programmable controller in this state by switching the RUN/STOP switch of the programmable controller to the RUN side. In this case, the microprocessor 11 does not recognize a change of an input/output organization, so that the programmable controller is operated with the input/output organization being unchanged or is operated with the input/output organization being changed according to any one of the first, second and third allocation methods.

As described above, according to this embodiment, the programmable-controller is provided with: the main body unit 10a containing the microprocessor 11 and various memories 12, the microprocessor 11 operating in accordance with contents of the program memory 12p in which a sequence program created by a user is stored and contents of the system memory 12s in which a system program created by a manufacturer is stored to thereby generate a signal to an output device which corresponds to a signal from an input device; and the plurality of input/output extension blocks 20a to be connected to the main body unit 10a. The programmable controller is also provided with the block type identifying means 26 and 16 that are provided in each input/output extension block 20a and identify types and arrangements of the input/output extension blocks 20a, which consists of the number of their input points and the number of their output points, the communication identifying means 27a that is provided in each input/output extension block 20a and identifies the input/output extension block 20a with which communication is being performed, the present organization storing means 12f that is provided in the main body unit 10a and stores the present organization input/output numbers, which correspond to unit types and arrangements obtained by the block type identifying means 26 of the input/output extension blocks 20a with which communication is currently being conducted, are read one after another based on the communication identifying means 27a and, and the rewrite setting means S108 that determines existence of an organization update instructing signal to be inputted from the outside following change, addition or removal of the input/output extension blocks 20a and updates contents of the present organization storing means 12f according to an allocation method selected in response to a result of the determination, from a plurality of allocation methods designated by the organization update instructing signal. Moreover, allocation of input/output numbers on the sequence program is carried out by a method selected from the plurality of allocation methods according to contents of the rewrite setting means S108. Thus, when a connection organization of the input/output extension units 20a is changed, since it is possible to select various input/output allocation methods, a user can allocate input/output numbers in a manner that accords with the user's intention. Therefore, since allocation of input/output numbers can be readily carried out by a learning operation without relying on rewriting of parameters as conventionally done, even a novice user who is unfamiliar with operations of a computer can easily allocate input/output numbers.

Second Embodiment

Figure 11:
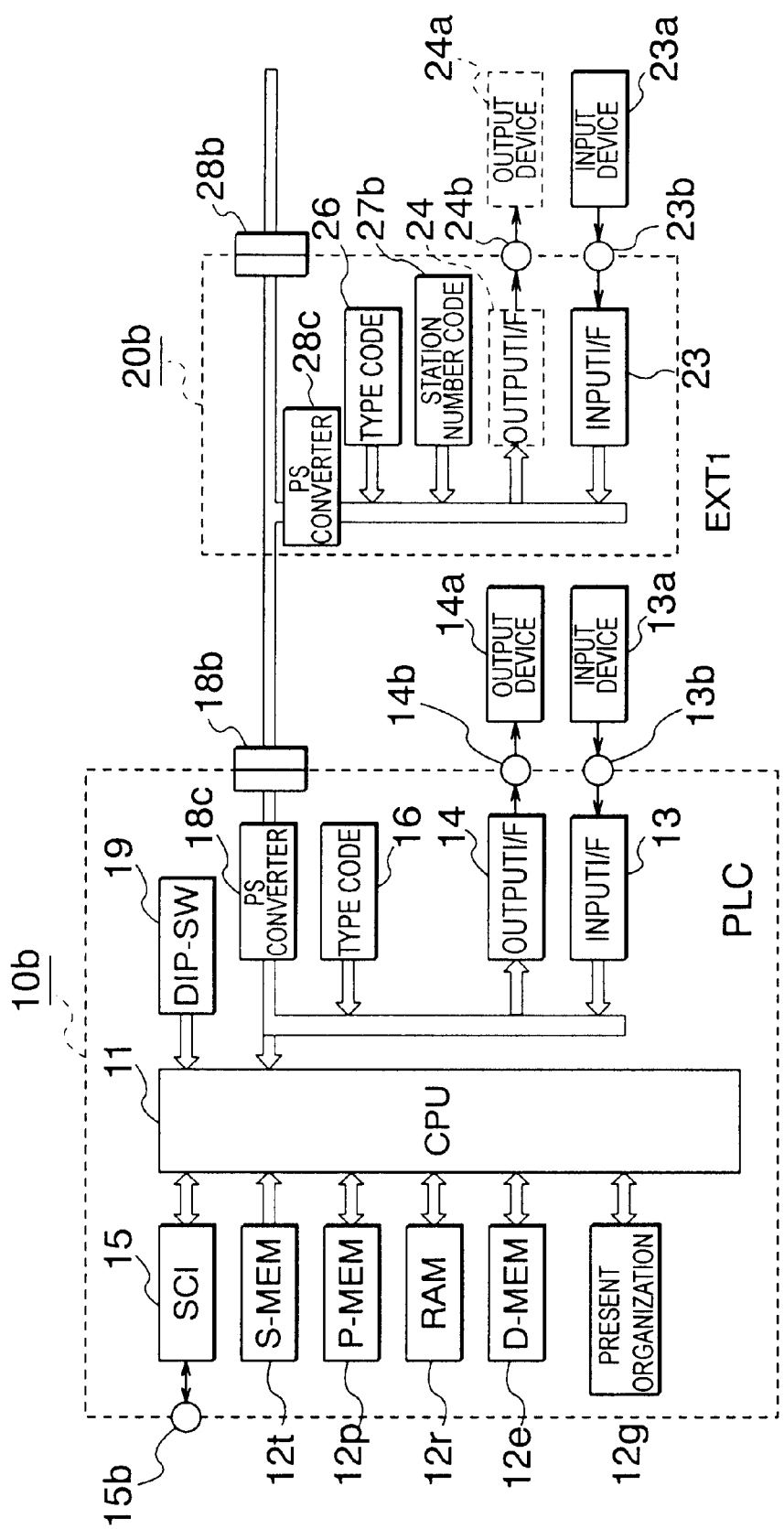
FIG. 11 is a block diagram showing a configuration of a programmable controller in accordance with a second embodiment of the present invention.

FIG. 11 is a block diagram showing a configuration of a programmable controller according to a second embodiment of the present invention. In FIG. 11, the configuration will be described centering on differences from that in FIG. 1. The same components as those in FIG. 1 are denoted by the identical reference characters and descriptions of such components will be omitted here. Reference numeral 10b denotes a main body unit of the programmable controller, which has differences from that in the first embodiment as described below. Reference numeral 12t denotes a system memory such as a flash memory in which is stored a system program that is created by a manufacturer of the programmable controller so that the microprocessor 11 carries out basic operations, 12e denotes a device memory that is a part of an RAM memory 12r, and 12g denotes a present organization memory (present organization storing means) to be described later with reference to FIG. 13. In the above-mentioned device memory 12e, ON/OFF states or driven/non-driven states of various devices such as an input relay X, an output relay Y, an auxiliary relay M, a timer T and a counter C handled by the programmable controller are stored as I/O information. A configuration of a part of the device memory 12e will be described in FIG. 12 in detail.

Reference numeral 18b denotes a detachable connector for serially connecting input/output extension blocks 20b, 30b and 40b (30b and 40b are not shown) to be described later to the above-mentioned microprocessor 11, 18c denotes a parallel/serial converter connected between the microprocessor 11 and the above-mentioned detachable connector 18b, and 19 denotes a multi-polar (i.e., having a plurality of buttons SW1, SW2, . . . ) small switch attached to an electronic substrate. The small switch is used for instructing update of an input/output organization instead of the external tool 15a of FIG. 1 and, at the same time, used as an input switch of specific numbers that can be handled on a sequence program, in an operating state of the programmable controller. As constituent elements of the input/output extension block 20b, reference numeral 27b denotes a station number setting switch such as a rotary switch, 28c denotes a parallel/serial converter and 28b denotes a detachable connector for connecting a later stage. The above-mentioned station number setting switch 27b becomes communication identifying means for identifying an input/output extension block with which the microprocessor 11 is currently communicating when the microprocessor 11 carries out communication for exchanging input/output signals with a plurality of input/output extension blocks. Further, the above-mentioned station number setting switch 27b usually sets numbers such as 1, 2, 3, . . . from the input/output extension block closest to the main body unit 10b, although it is not necessary to match the numbers with an arrangement order as long as the numbers do not overlap each other.

Figure 14:
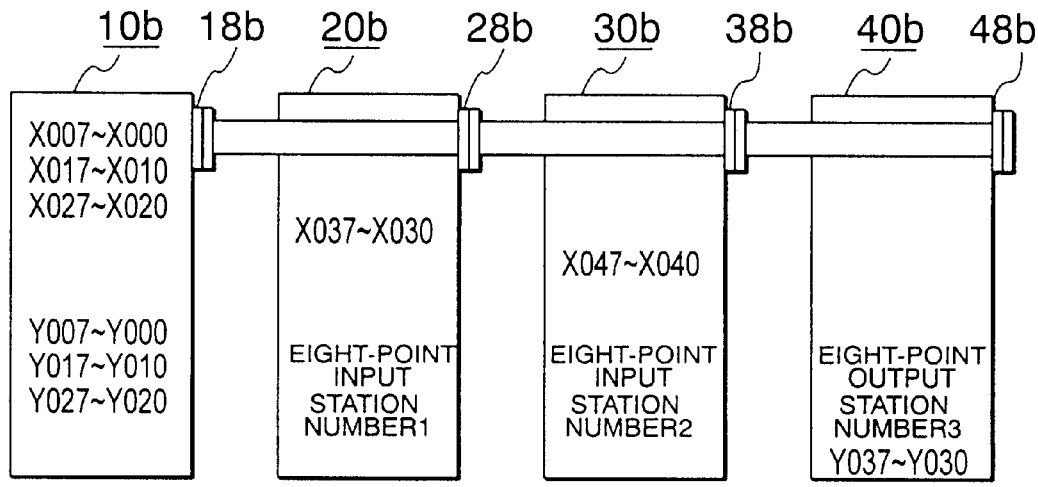
FIG. 14 is an explanatory view showing an example of an initial extended organization of the programmable controller in accordance with the first embodiment of the present invention.

In FIG. 12 showing a configuration of a part of the device memory 12e of FIG. 11, ON/OFF information of inputs X170 to X177 is stored as I/O signals in a memory address ADR 15. Although this corresponds to an ON/OFF state of the small switch 19 in FIG. 11, other inputs and outputs are identical with those in the case of FIG. 2. FIG. 13 showing an example of contents of the present organization memory 12g of FIG. 11 corresponds to FIG. 14 showing an input/ output organization to be described later. In this example, it is indicated that the number of input points is twenty-four, the top input number is X000, the number of output points is twenty-four and the top output number is Y000 for the main body unit. It is indicated that the number of input points is eight, the top input number is X030 and the number of output points is zero for the input/output extension block 20b of a station number 1. It is indicated that the number of input points is eight, the top input number is X040 and the number of output points is zero for the input/output extension block 30b of a station number 2. Similarly, it is indicated that the number of input points is zero, the number of output points is eight and the top output number is Y030 for the input/output extension block 40b of a station number 3 and input/output extension blocks of subsequent station numbers are not connected.

FIGS. 14 to 17 show an example of an entire organization of the programmable controller using the main body unit 10b and the input/output extension blocks 20b, 30b, 40b and 50b. In FIGS. 14 to 17, the main body unit 10b is provided with twenty-four input points X000 to X027 and twenty-four output points Y000 to Y027. In FIG. 14 shown as an initial organization, the eight-point type input extension block 20b is set in the station number 1, the eight-point type input extension block 30b is set in the station number 2 and the eight-point type output extension block 40b is set in the station number 3. Input/output numbers which are serial numbers with respect to those of the main body unit 10b are allocated to each input/output extension block. Moreover, the input/output numbers are allocated in accordance with an order of the station numbers, and thus not according to an order of connection to the main body unit 10b (however, the order of the input/output numbers to be allocated happens to coincide with the order of connection in this example).

Figure 15:
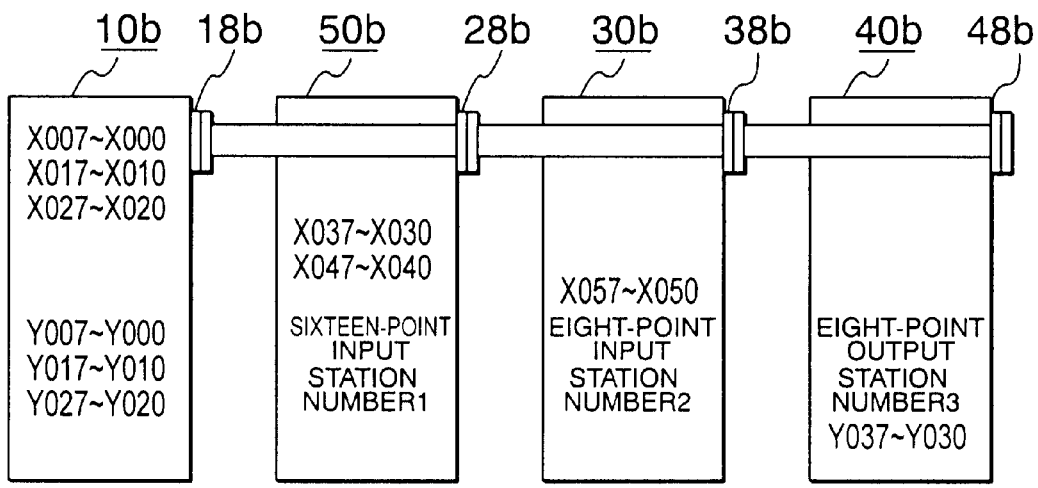
FIG. 15 is an explanatory view showing an example of an organization of the programmable controller by a first allocation method, in accordance with the first embodiment of the present invention.

In FIG. 15 showing an example of changing an organization based on a first allocation method to be described later, the sixteen-point type input extension block 50b is provided in place of the eight-point type input extension block 20b in FIG. 14, and a station number is 1 as in FIG. 14. Thus, X030 to X047 that are serial numbers with respect to those of the main body unit 10b are allocated as input numbers of the input extension block 50b of the station number 1. Moreover, input numbers allocated to the input extension block 30b of the station number 2 is changed to x050 to X057 that are serial numbers with respect to those of the station number 1. The eight-point type output extension block 40b of the station number 3 is not affected by the change of an organization and thus has the same output numbers Y030 to Y037.

Figure 16:
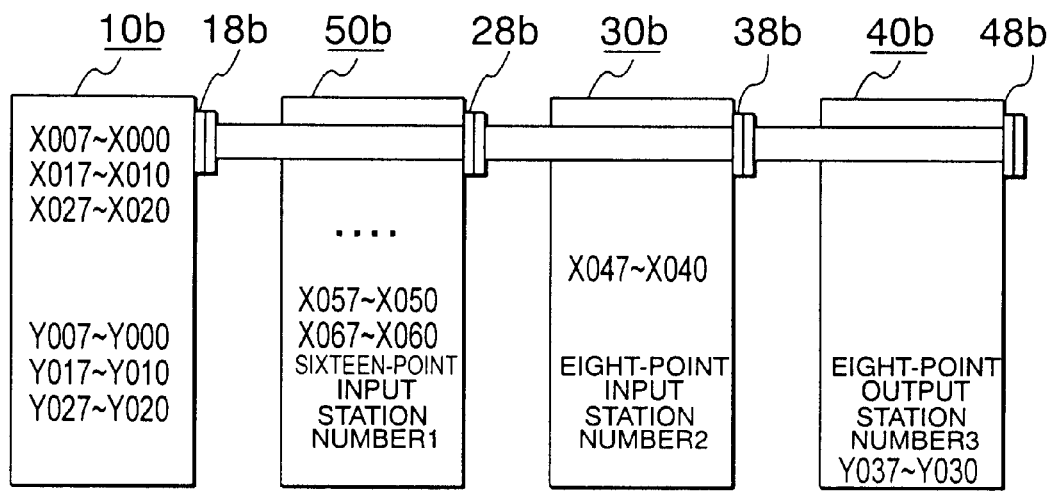
FIG. 16 is an explanatory view showing an example of an organization of the programmable controller by a second allocation method, in accordance with the first embodiment of the present invention.

In FIG. 16 showing an example of changing an organization based on a second allocation method to be described later, a sixteen-point type input extension block 50b is provided in place of the eight-point type input extension block 20b in FIG. 14 and the station number is 1 as in FIG. 14. Thus, X050 to X067 that are serial numbers from those of the existing input extension block 30b are allocated as input numbers of the input extension block 50b that is alternatively provided, despite the fact that the station number is 1. Therefore, the input numbers X030 to X037 of the input extension block 20b removed in the new organization become missing numbers and the input numbers of the remaining input extension block 30b are unchanged. The eight-point type output extension block 40b of the station number 3 is not affected by the change of an organization and thus has the same output numbers Y030 to Y037.

Figure 17:
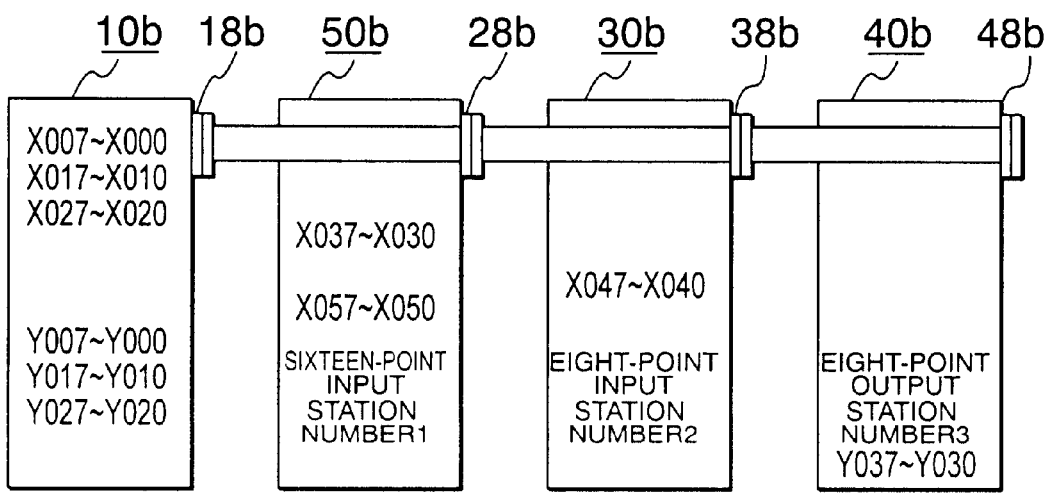
FIG. 17 is an explanatory view showing an organization of the programmable controller by a third allocation method, in accordance with the first embodiment of the present invention.

In FIG. 17 showing an example of changing an organization based on a third allocation method to be described later, the sixteen-point type input extension block 50b is provided in place of the eight-point type input extension block 20b in FIG. 14 and the station number is 1 as in FIG. 14. Thus, X030 to X037 that were allocated to the removed input extension block 20b and X050 to X067 that are serial numbers from those of the existing input extension block 30b are allocated as input numbers of the input extension block 50b that is alternatively provided anew. Therefore, the input numbers S030 to X037 of the input extension block 20b that is replaced and removed in the new organization do not become missing numbers and the input numbers of the remaining input extension block 30b are not changed. The eight-point type output extension block 40b of the station number 3 is not affected by the change of an organization and thus has the same output numbers Y030 to Y037.

The present organization memory 12g of FIG. 11 is provided for storing the type code, that is the number of input/output points, of the main body unit 10b and the type code, that is the number of input/output points, of the input/output extension blocks that follow in accordance with the order of station numbers. The present organization memory 12g stores a current input/output organization even if an input/output organization is changed, as long as an organization update instruction signal to be described later is not generated. Further, the above-mentioned second and third allocation methods are suitable for temporarily processing for changing an input/output organization during a trial operation of the programmable controller. The first allocation method is suitable for arranging a permanent input/output organization at the time of starting an operation of the programmable controller for the first time or in a final stage after various trial operations have been performed.

In relation to the input/output organizations of FIGS. 14 to 17, it is required to note the following issues. If an input/output extension block of a station number that is serial to the largest station number of an existing input/output organization is added, input/output numbers of the added input/output extension block are larger serial numbers with respect to input/output numbers of the existing input/output extension blocks, in any of the first, second and third allocation methods. Moreover, this is true regardless of the connecting position of the input/output extension block. Therefore, when adding an input/output extension block, confusion is avoided if a larger station number is given rather than using a station number from those of existing blocks.

As regards the removal of an existing input/output extension block, since an input/output extension block of a stored station number disappears, it is possible to determine which input/output extension block has been removed by comparing new and old organizations against each other. As regards the case in which another input/output extension block is additionally inserted between existing input/output extension blocks, it is possible to determine which input/output extension block has been inserted by comparing new and old organizations against each other, as long as overlapping station numbers are not set. Therefore, the programmable controller using the station number setting method has a characteristic that, although a switch for setting a station number is required, addition, removal, change and the like of an input/output extension block become clear and an input/output number can be changed easily.

Figure 18:
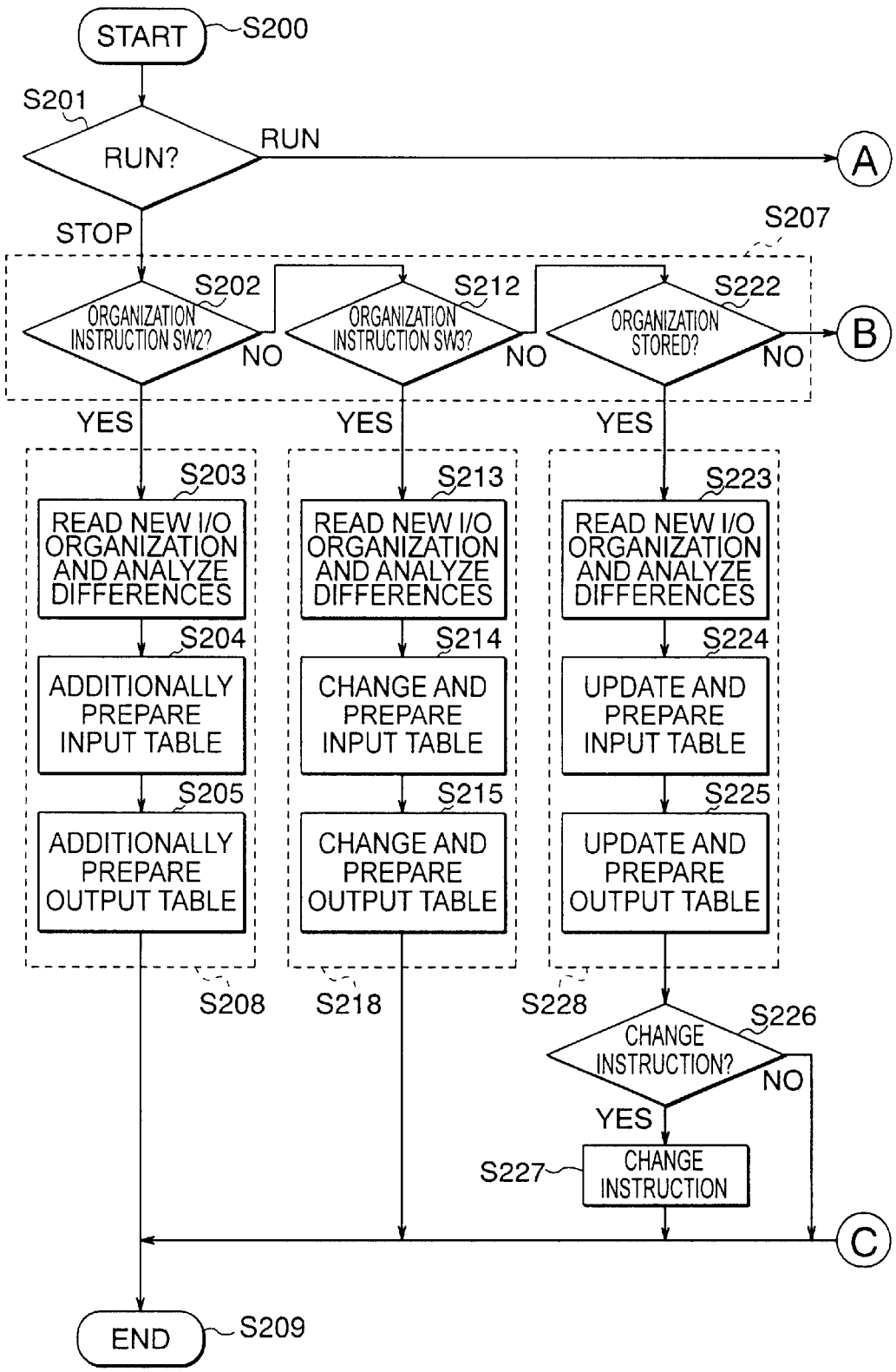
FIG. 18 is a flow diagram showing a flow of processing of the programmable controller in accordance with the second embodiment of the present invention.
Figure 19:
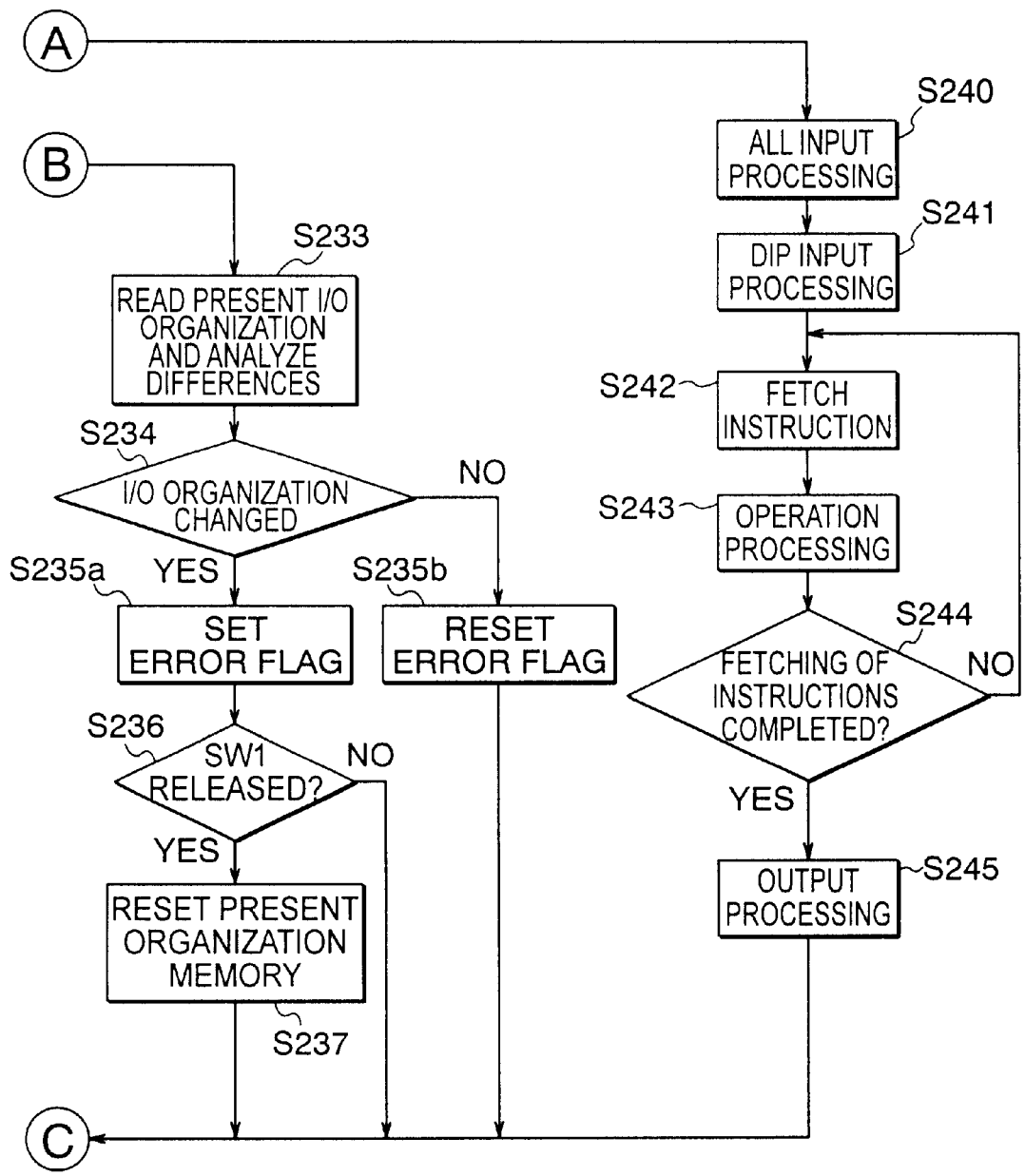
FIG. 19 is a flow diagram showing a flow of processing of the programmable controller in accordance with the second embodiment of the present invention.

Next, operations of the programmable controller in the second embodiment shown in FIG. 11 will be described. FIGS. 18 and 19 are flowcharts describing a part of operations of a system program stored in the system memory 12t of FIG. 11. In FIGS. 18 and 19, reference character S200 denotes an operation starting step of the microprocessor 11; S201 denotes a step acting subsequent to the step S200 to determine a state of a not-shown RUN/STOP switch provided in the main body unit 10*b*; S202 denotes a step acting when the step S201 determines a state as STOP, to determine whether or not SW2 of the small switch 19 has been pressed; S203 denotes a step acting when the step S202 determines YES, to compare reading of an input/output organization at the present point in time against contents of the present organization memory 12*g* already stored to thereby analyze differences between the organizations; S204 denotes a step of allocating input numbers of each input/output extension block in a manner as shown in FIG. 16, based on a result of the above-mentioned analysis; S205 denotes a step of allocating output numbers of each output extension block in a manner as shown in FIG. 16; and S208 denotes rewrite setting means of the second allocation method consisting of the above-mentioned steps S203, S204 and S205, which updates and rewrites the present organization memory 12*g* through the above-mentioned steps S204 and S205.

Reference character S212 denotes a step acting when the step S202 determines NO, to determine whether or not SW3 of the small switch 19 has been pressed; S213 is a step acting when the step S212 determines YES, to compare reading of an input/output organization at the present point in time against contents of the present organization memory 12*g* already stored to thereby analyze differences between the organizations; S214 denotes a step of allocating input numbers of each input extension block based on a result of the above-mentioned analysis in a manner as shown in FIG. 17; S215 denotes a step of allocating output numbers of each output extension block in a manner as shown in FIG. 17; and S218 denotes rewrite setting means of the third allocation method consisting of the above-mentioned steps S213, S214 and S215, which updates and rewrites the present organization memory 12*g* through the above-mentioned steps S214 and S215.

Reference character S222 denotes a step acting when the step S212 determines NO, to determine whether or not the present organization memory 12*g* already stores an input/output organization; S223 denotes a step acting when the step S222 determines YES, to read an input/output organization at the present point in time; S224 denotes a step of allocating input numbers of each input extension block in a manner as shown in FIG. 15; S225 denotes a step of allocating output numbers of each output extension block in a manner as shown in FIG. 15; S226 denotes a step acting subsequent to the step S225 to determine whether or not SW4 of the small switch 19 is ON; S227 denotes a step acting when the step S226 determines YES, to change input/output numbers in the sequence program in the above-mentioned program memory 12*p* based on an input/output number system organized anew; and S228 denotes rewrite setting means of the first allocation method consisting of the above-mentioned steps S223, S224 and S225, which updates and rewrites the present organization memory 12*g* through the above-mentioned steps S224 and S225.

Reference character S233 denotes a step acting when the step S222 determines NO, to compare reading of an input/output organization at the present point in time against contents of the present organization memory 12*g* already stored to thereby analyze differences between the organizations; S234 denotes a step acting subsequent to the step S233 to determine whether or not an input/output organization has been changed; S235*a* denotes a step acting when the step S234 determines that an input/output organization has been changed, to set a not-shown error flag; S236 denotes a step acting subsequent to the step S235*a* to determine whether or not SW1 of the small switch 19 has been pressed; S237 denotes a step acting when the step S236 determines YES, to reset contents of the present organization memory 12*g* of FIG. 11; and S235*b* is a step acting when the step S234 determines that an input/output organization has not been changed, to reset the error flag set in step S235*a*. Further, when the contents of the present organization memory 12*g* are reset by the step S237, since the step S222 determines NO in the next operation cycle and update and rewriting of the present organization memory 12*g* is carried out by the rewrite setting means S228, the same result as that obtained when the first allocation is executed is obtained.

Reference character S240 denotes a step acting when the step S201 determines RUN, to fetch ON/OFF states of all the input devices 13*a*, 23*a*, . . . into the device memory 12*e* and S241 denotes a step of fetching an ON/OFF state of the small switch 19 into the device memory 12*e*, and the fetched ON/OFF states are allocated as shown in ADR 15 of FIG. 12. Reference character S242 denotes a step acting subsequent to the step S241 to read one of sequence instructions from the above-mentioned program memory 12*p*; S243 denotes a step acting subsequent to the step S242 to carry out an arithmetic operation with respect to the sequence instruction fetched in step S242 and write a result of the arithmetic operation in the RAM memory 12*r*; and S244 denotes a step of determining whether or not execution of all the instructions has been completed. When it has not been completed, the processing returns to step S242.

Reference character S245 denotes a step acting when the step S244 determines that fetching of instructions has been finished, to carry out output to the output devices 14*a*, 24*a* and so on from the device memory 12*e*. In the process of executing the step S243, an operation state at the time of executing an instruction is written in the corresponding output portion of the device memory 12*e* (see FIGS. 11 and 12). Note that, a method of fetching all input states before executing an instruction and carrying out output processing with respect to all outputs after processing and execution of all instructions have been finished is referred to as a batch input/output method, whereas the method shown in FIGS. 9 and 10 in the above-mentioned first embodiment is a method of carrying out input/output processing each time an input/output instruction is executed.

Reference character S207 denotes means for determining existence of an organization update instruction consisting of the above-mentioned steps S202, S212 and S222, and S209 denotes an operation ending step acting when the determining steps S226 and S236 determine NO or following the above-mentioned steps S205, S215, S227, S237, S235*b* and S245, to shift the processing to the starting step S200, for example, after a predetermined period of time following the end of the operation. Note that, even if an error flag is set by the step S235*a*, it is possible to switch the RUN/STOP switch of the programmable controller to the RUN side to enable operation even in this state. In this case, the microprocessor 11 does not recognize a change of an input/output organization and is operated with the old, unchanged input/output organization or is operated with the input/output organization being changed in any one of the first, second and third allocation methods.

As described above, the same effect as that in the first embodiment can be realized in this embodiment. Moreover, since the multi-polar small switch 19 is incorporated in the main body unit 10*a* instead of the external tool 15*a* shown in the first embodiment and an organization update instruction signal is input by the small switch 19, provision of an expensive external tool or the like is unnecessary in processing an input/output organization and, also during operation of the programmable controller, it is possible to increase added values of the programmable controller by effectively making use of it for other purposes.

Third Embodiment

In this embodiment, an example of a modification of the above-mentioned first and second embodiments will be described.

Although the main body unit 10a or 10b, and the input/output extension blocks 20a, 30a, 40a, . . . or 20b, 30b, 40b, . . . are separate structures in the first and second embodiments described above, these may be integrally contained in one box.

In addition, the number of input and output points in the main body unit 10a or 10b may be set to zero, and all inputs and outputs are handled by extension blocks.

In addition, although a plurality of organization update instruction signals are generated according to various allocation methods in the first and second embodiment described above, the various allocation methods may alternatively be designated with a selection switch in advance to execute them by one organization update instruction signal.

Although an example of changing an input extension block is explained in the above descriptions of FIGS. 5 to 8 and FIGS. 14 to 17, the same is true for a change of an output extension block.

Further, although the input and output numbers shown in FIGS. 5 to 8 and FIGS. 14 to 17 are set according to a method referred to as an individual serial number method (input is from the number X000 and output is also from the number Y000), the numbers may be set according to a merged serial number method.

The merged serial number method is a method in which overlapping numbers are not used for an input X and an output Y. For example, input and output numbers are allocated as X000 to X047 and Y050 to Y067.

In the station number setting method shown in FIG. 11, for example, a two-digit rotary switch is used as the station number setting switch 27b. A numerical value of the first digit of a station number of a two-digit numerical value can be classified as shown below, whereby it is possible to prevent irregular missing numbers and skipped numbers from being generated in input and output numbers on a sequence program.

(1) 0, 1: first digit of a station number for an input/output extension block of an eight-point or a sixteen-point type.
(2) 2 to 5: first digit of a station number for an input/output extension block of a four-point type, and is allocated to any one of bit0 to bit3 or bit4 to bit7 in the device memory of FIG. 12.
(3) 6 to 9: first digit of a station number for an input/output extension block of an-one-point or two-point type, and is allocated sequentially without skipped number, to bit0 to bit7 in the device memory of FIG. 12.

Input and output numbers on the sequence program can be represented as label symbols of less than a predetermined word length by preparing a comparison table in advance. For example, if STB1 (start button 1) is represented as X002 on the comparison table, the programmable controller operates according to a prescribed symbol based on the comparison table even if a meaningful symbol that can be easily understood by a user is used on the program.

As is evident from the above descriptions, the gist of the present invention can be summarized as follows, and various modified embodiments are made based on this.

(1) The present organization memory is not of a parameter type to which a user writes detailed contents, but is for reading a type code (information on the number of input points and the number of output points) provided in an input/output extension block, based on an organization update instruction issued by an operation of the user and then automatically allocating input and output numbers. At least two types of allocation methods suitable for temporal allocation and permanent allocation of input and output numbers are prepared, so that the user's intention can be properly reflected.
(2) In the second and third allocation methods suitable for temporal allocation of input and output numbers, input and output numbers of remaining input/output extension blocks do not change in response to removal, insertion, change and the like of an input/output extension block, whereby the input and output numbers on an existing sequence control program are not affected.
(3) In the first allocation method that is suitable for permanent allocation of input and output numbers, although input and output numbers of remaining input/output extension blocks may completely change in response to removal, insertion, change and the like of an input/output extension block, confusion can be avoided by preparing an automatic change function for input and output numbers on a sequence control program.
(4) In the programmable controller of a type in which organization states are stored in accordance with the order of connection to the main body unit, a changed input/output extension block can be determined using parallel-off organization storing means. Thus, since a station number setting switch is not incorporated, the programmable controller is inexpensive and does not require a station number setting operation by a user.

Thus, it has been seen that a programmable controller is provided. One skilled in the art will appreciate that the present invention can be practiced in a form other than the preferred embodiments which are presented for the purposes of illustration and not of limitation, and the present invention is limited only by the claims which follow.

What is claimed is:

1. A programmable controller comprising: a main body unit containing a microprocessor and various memories, the microprocessor operating in accordance with contents of a program memory in which a sequence program is stored and contents of a system memory in which a system program is stored to thereby generate a signal to an output device corresponding to a signal from an input device; and a plurality of input/output extension blocks connected to said main body unit, wherein the programmable controller comprises:
block type identifying means that is provided in each of said input/output extension blocks and identifies a type and an arrangement of an input/output extension block which indicate the number of input and output points in said input/output extension block;
communication identifying means that is provided in each of said input/output extension blocks and identifies an input/output extension block communicating with said microprocessor;
present organization storing means provided in said main body unit, which sequentially reads addresses of the input/output extension blocks with which communication is currently being conducted based on a result of identification by said communication identifying means, and stores input and output numbers corresponding to types and arrangements of input/output extension blocks obtained by said block type identifying means of the input/output extension blocks; and rewrite setting means that determines existence of an organization update instructing signal that is inputted from the outside following change, addition or removal of said input/output extension block and updates, in response to a result of the determination, contents of said present organization storing means by an allocation method selected from a plurality of predetermined allocation methods designated by said organization update instructing signal; and wherein allocation of input/output numbers on said sequence program is carried out by a method selected from said plurality of allocation methods according to contents of said rewrite setting means.

2. A programmable controller according to claim 1, wherein:

said input/output extension block and said main body unit are configured as separate bodies and said main body unit includes a part of input/output functions; and said main body unit further comprises unit type identifying means for identifying a type and an arrangement of said main body unit which indicate the number of input and output points in said main body unit.

3. A programmable controller according to claim 1, wherein:

said rewrite setting means includes a system program according to at least a first and a second allocation methods stored in said system memory;

in said first allocation method, input and output numbers of all new and old input/output extension blocks in a new organization are allocated as serial numbers from the input and output numbers of said main body unit, in one of an arrangement order in the organization and a station number order; and in said second allocation method, when an input/output extension block existing in the present organization is removed in the new organization, deleted input and output numbers are regarded as missing numbers and, when an input/output extension block not existing in the present organization is added in the new organization, added input and output numbers are treated as additional numbers to the present organization, whereby input and output numbers are allocated so as not to change input and output numbers of remaining input/output extension blocks.

4. A programmable controller according to claim 3, wherein said system memory further comprises instruction changing means for correcting input and output numbers of a sequence program stored in said program memory to new input and output numbers when a new organization by said first allocation method is carried out.

5. A programmable controller according to claim 3, wherein, if said present organization storing means has not yet stored an input/output organization or if said present organization storing means has reset an input/output organization which it stored, allocation of input and output numbers by said first allocation method is carried out.

6. A programmable controller according to claim 3, wherein said rewrite setting means further includes a system program according to a third allocation method stored in said system memory, and in said third allocation method, when an input/output extension block existing in the present organization is changed to an input/output block of another form in a new organization, the number of missing input/output numbers are restricted to minimum and input/output numbers not existing in the present organization are treated as additional numbers to the present organization, whereby input/output numbers are allocated in a manner so as not to change input/output numbers of remaining input/output extension blocks.

7. A programmable controller according to claim 1, further comprising:

confirming and reading means for reading a present input/output organization in the state in which said organization update instruction signal is not inputted; and abnormality determining means for comparing a result of reading by said confirming and reading means against contents stored in said present organization storing means, and for generating an error output when there is a difference between the result and the both contents.

8. A programmable controller according to claim 1, further comprising parallel-off organization storing means for, when said input/output extension block is paralleled off from said main body unit and a parallel-off organization storing instruction is inputted from the outside, storing an organization of other input/output extension blocks connected to said main body unit.

9. A programmable controller according to claim 1, wherein a multi-polar small switch is incorporated in said main body unit and a part of said small switch is used as a switch for an organization update instruction signal, and wherein in an operation state of the programmable controller, the small switch is used as an input switch of a specific number that can be handled on a sequence program.

* * * * *